(12) United States Patent
Johnson

(10) Patent No.: US 11,353,310 B2
(45) Date of Patent: Jun. 7, 2022

(54) TILE SQUARE

(71) Applicant: Ashton Travis Johnson, Jacksonville, FL (US)

(72) Inventor: Ashton Travis Johnson, Jacksonville, FL (US)

( * ) Notice: Subject to any disclaimer, the term of this patent is extended or adjusted under 35 U.S.C. 154(b) by 69 days.

(21) Appl. No.: 16/946,259

(22) Filed: Jun. 12, 2020

(65) Prior Publication Data
US 2021/0389109 A1 Dec. 16, 2021

(51) Int. Cl.
*G01B 3/04* (2006.01)
*G01B 3/00* (2006.01)

(52) U.S. Cl.
CPC .............. *G01B 3/04* (2013.01); *G01B 3/004* (2013.01)

(58) Field of Classification Search
None
See application file for complete search history.

(56) References Cited

U.S. PATENT DOCUMENTS

| | | | |
|---|---|---|---|
| 1,255,429 A | 2/1918 | Killion | |
| 2,371,485 A * | 3/1945 | Waldman | B05C 17/06 33/565 |
| 4,420,891 A * | 12/1983 | Orem | G01B 3/566 33/476 |
| 5,170,568 A | 12/1992 | Wright | |
| D369,981 S | 5/1996 | Hayes et al. | |
| 5,575,074 A | 11/1996 | Cottongim et al. | |
| 5,727,325 A * | 3/1998 | Mussell | B43L 7/027 33/429 |
| 5,813,126 A * | 9/1998 | Dahl | B25H 1/0078 33/42 |
| D454,080 S | 3/2002 | Aguilar | |
| D454,312 S | 3/2002 | Anderson et al. | |
| 6,868,616 B2 * | 3/2005 | Allemand | E04D 15/025 33/476 |
| 7,174,650 B1 * | 2/2007 | Marshall | B43L 7/005 33/427 |
| 7,228,636 B1 * | 6/2007 | Moore | B43L 7/02 33/417 |
| 7,398,601 B2 * | 7/2008 | Morrell | B25H 7/00 33/429 |
| D587,606 S | 3/2009 | McMasters | |
| D657,701 S | 4/2012 | Martinez et al. | |
| D760,569 S | 7/2016 | Zinkosky, II | |
| 2004/0143982 A1 * | 7/2004 | Braun, Jr. | B43L 7/0275 33/429 |
| 2006/0156558 A1 * | 7/2006 | Owens | B43L 13/002 33/42 |

(Continued)

FOREIGN PATENT DOCUMENTS

| | | |
|---|---|---|
| CH | 662988 A5 | 11/1987 |
| GB | 1184127 A | 3/1970 |

*Primary Examiner* — Christopher W Fulton
(74) *Attorney, Agent, or Firm* — Mark Young, PA

(57) ABSTRACT

A tile square includes a right isosceles triangular substantially rigid transparent sheet with ruler indicia adjacent to the hypotenuse and one of the equal sides. A fence is provided along the other equal side. A plurality of templates are formed in the sheet between the sides and hypotenuse. The templates include a plurality of holes for a range of pipe sizes and a series of arcs defining peripheral boundaries of a closet or toilet flange. The equal sides of the tool are at least 18 inches in length.

20 Claims, 21 Drawing Sheets

(56) References Cited

U.S. PATENT DOCUMENTS

| | | | | |
|---|---|---|---|---|
| 2007/0074413 A1* | 4/2007 | Neuroth | ................ | G01B 21/02 |
| | | | | 33/429 |
| 2009/0260244 A1 | 10/2009 | Carbone, Jr. | | |
| 2014/0230361 A1* | 8/2014 | Wood | ..................... | E04F 21/22 |
| | | | | 52/747.11 |
| 2017/0284784 A1* | 10/2017 | Fuda | ........................ | B43L 7/10 |

* cited by examiner

TILE SQUARE

FIELD OF THE INVENTION

This invention relates generally to construction measuring and marking tools, and, more particularly, to a triangular square for tile setters.

BACKGROUND

Large format tile is in demand, for various reasons. Designers like the aesthetically pleasing open look such tiles give floors in residential and commercial spaces. Consumers favor the expanse and ease of maintaining fewer grouted joints.

Working with large format tiles presents installation challenges. Large format tiles require tighter tolerances in the substrate. In addition, the weight makes such tiles harder to handle and set. Compounding these challenges, the trend is towards increasingly larger size tiles, such as 24×24 inches and greater.

Making cutouts for pipes and toilet flanges present additional challenges for large format tiles. Conventional carpentry speed squares are useful for marking parallel and perpendicular lines on comparably sized tiles. However, they are ineffective for large format tiles. Most carpentry speed squares have 2 equal sides of about 7 inches in length, or in some cases up to 12 inches in length. Aside form being too small for large format tiles, conventional speed squares are intended for carpentry and other trades. As such they lack features truly required by tile setters. Such features include templates for marking holes for plumbing commonly used in residential and commercial construction. Holes are required for each of various sizes of plumping pipes and for closet flanges (aka toilet flanges). Conventional speed squares do not include templates for marking such holes, nor do they include enough surface area for a useful combination of such templates.

What is needed is a tile setter's square configured to accommodate large format tiles and equipped with a plurality of templates for marking holes for a range of pipes and a toilet flange. The invention is directed to overcoming one or more of the problems and solving one or more of the needs as set forth above.

SUMMARY OF THE INVENTION

To solve one or more of the problems set forth above, in an exemplary implementation of the invention, a tile square includes a triangular sheet or plate. The sheet is preferably substantially rigid and transparent. In a particular preferred embodiment the sheet is a right isosceles triangular sheet with ruler indicia adjacent to the hypotenuse and one of the equal sides. A fence is provided along the other equal side. A plurality of templates are formed in the sheet between the sides and hypotenuse. The templates include a plurality of holes for a range of pipe sizes and a series of arcs defining peripheral boundaries of a closet or toilet flange. In a particular preferred embodiment the arcs are positioned to allow marking a required distance from a wall. The equal sides of the tool are at least 18 inches in length, and preferably greater.

In another exemplary embodiment, a tile marking tool according to principles of the invention includes a sheet. The sheet has a right isosceles plan shape, with three sides, one of the three sides being a hypotenuse, and the other two of the three sides being about equal length. The equal length is at least 18, preferably at least 19 inches. A plurality of holes are provided in the sheet. Each hole has a circular shape and a diameter. The diameter of each hole corresponds to an outer diameter of a pipe. The diameter of each hole is different from the diameter of each other hole.

A fence is attached to one of the two sides of about equal length. The sheet is a transparent plastic sheet. The fence is a bar coterminous in length with the side to which the fence is attached. The attachment may be permanent or releasable. For example, a sliding joint may releasably connect the fence to the side to which the fence is attached.

A plurality of (e.g., 4) arc-shaped apertures are formed in the sheet. The apertures are evenly spaced, have a common center and define portions of a perimeter of a circle having a diameter about equal to the outer diameter of a toilet flange. Each aperture subtends an angle of about 60°. Indicium or a small hole (e.g., less than ⅜ in. diameter) may mark the common center of the plurality of apertures.

Ruler indicia is provided along the side opposite the side to which the fence is attached and along the hypotenuse. The ruler indicia includes tick marks and numbers indicating lengths designated by some of the tick marks. The tick marks are parallel spaced apart lines. In one embodiment, the ruler indicia may be laser engravings.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary tile square (a tool) according to principles of the invention comprises a triangular sheet or plate. The sheet is preferably substantially rigid and transparent. In a particular preferred embodiment the sheet is a right-isosceles triangular sheet with ruler indicia adjacent to the hypotenuse and one of the equal sides. A fence is provided along the other equal side. The fence is coterminous with the side. A plurality of templates are formed in the sheet between the sides and hypotenuse. The templates include a plurality of holes for a range of pipe sizes and a series of arcs defining peripheral boundaries of a closet or toilet flange. In a particular preferred embodiment the arcs are positioned to allow marking a required distance from a wall. The equal sides of the tool are at least 18 inches (45.72 centimeters) in length, and preferably greater. In the illustrated exemplary embodiment, the length of each equal side, excluding the thickness of the fence 125, is about 20 in., more precisely about 19 11/16 in., although the ruler tick marks end at about 19 7/16 in. The length of the hypotenuse, excluding the thickness of the fence 125, is about 28 in., more precisely about 27 13/16 in., although the ruler tick marks end at about 27 9/16 in. With equal sides of at least 18 in., the tool may be used to reliably mark to the center of up to 36 in ×36 in tiles.

Figure 1:
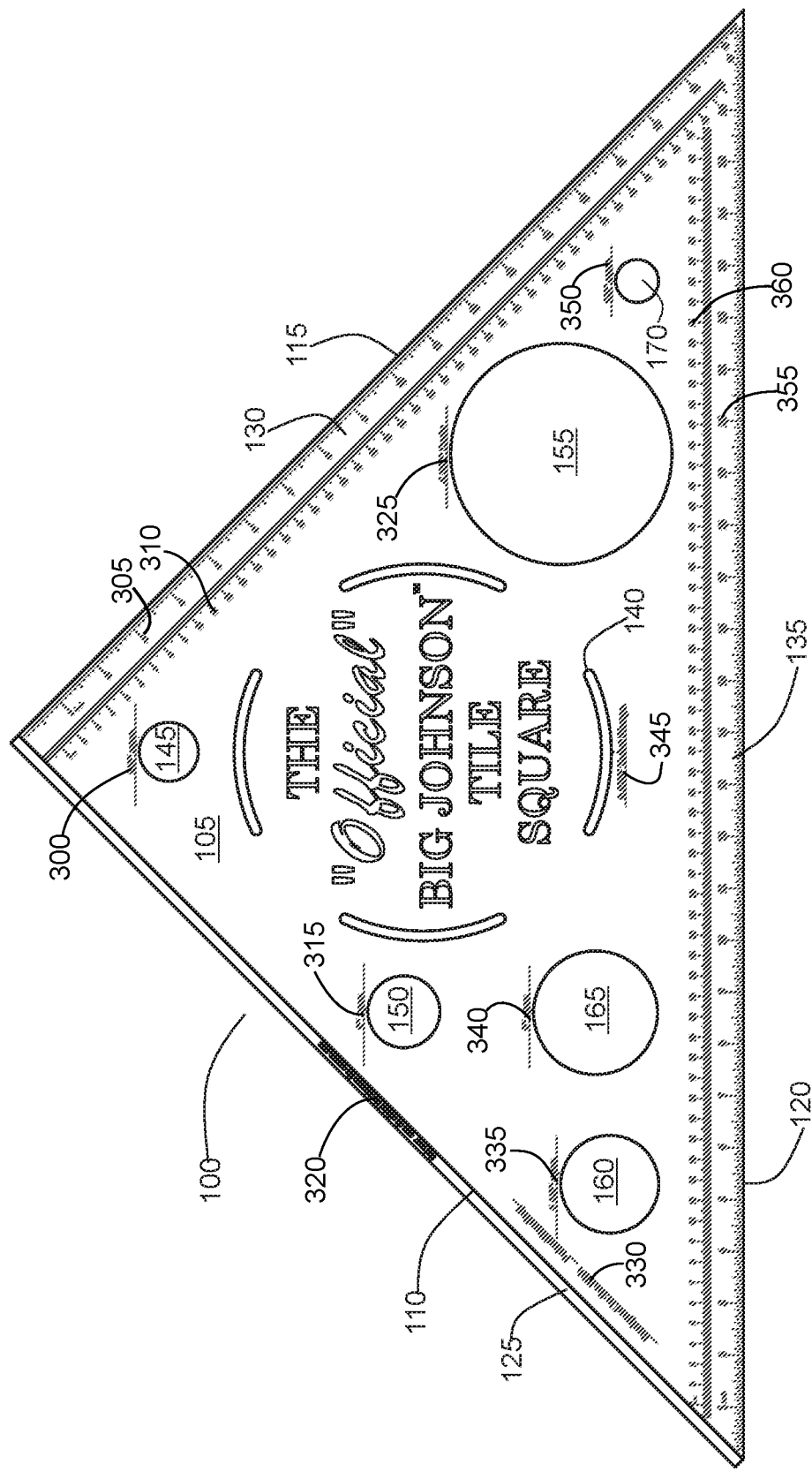
FIG. 1 is a plan view of an exemplary tile square according to principles of the invention.
Figure 2:
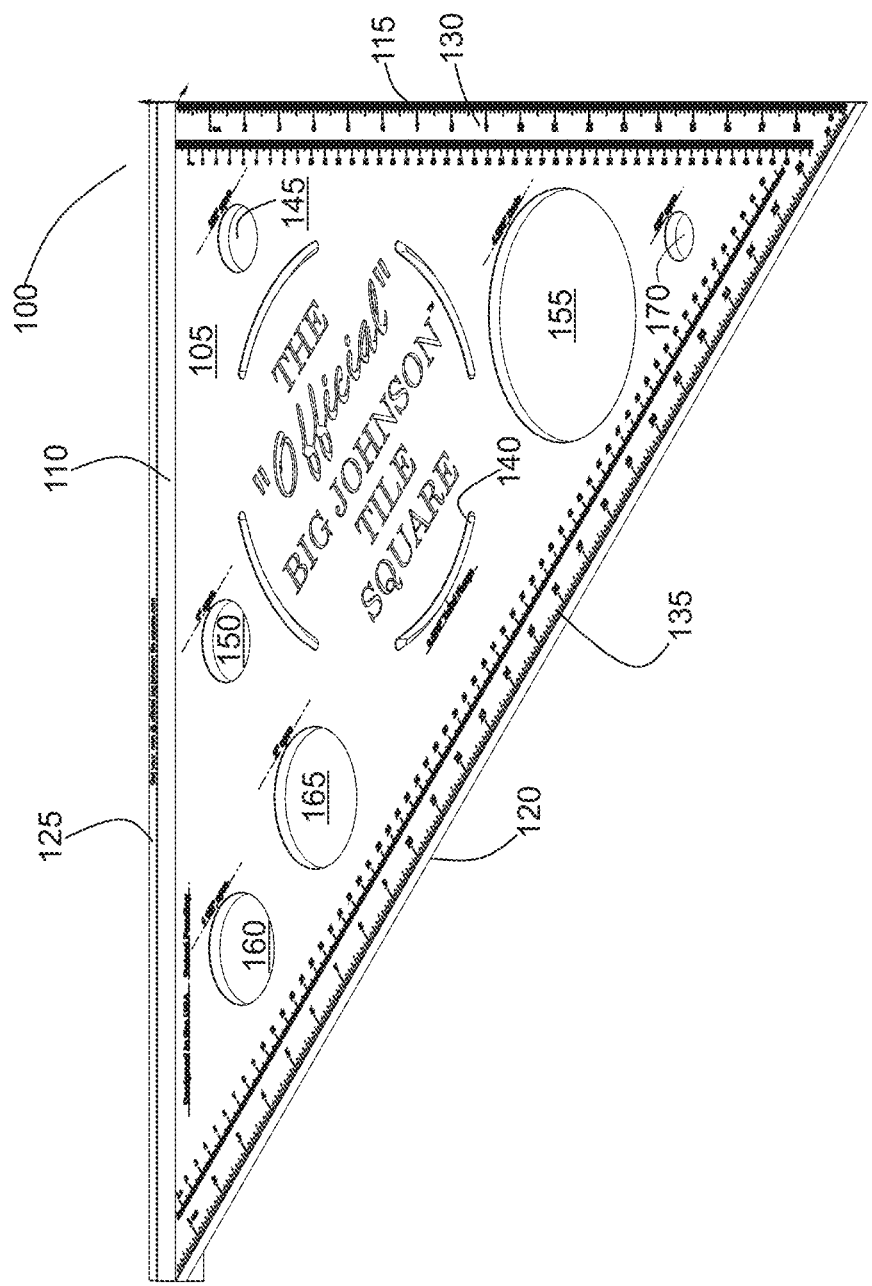
FIG. 2 is a perspective view of an exemplary tile square according to principles of the invention.

Referring to FIGS. 1 and 2 views of an exemplary tile square 100 according to principles of the invention is provided. The tile square 100 has the plan shape of a right isosceles triangle, with two sides of equal length 110, 115, and a hypotenuse. The angle between the two sides of equal length 110, 115 is 90°. The angle between the hypotenuse and each other side is 45°.

Rulers 130, 135 are provided immediately adjacent to one of the equal length sides and the hypotenuse. With reference to FIGS. 1, 2 and 16-21, ruler indicia include alphanumeric characters and tick marks. The alpha numeric characters include letters that indicate the scale—metric (cm and mm) 310, 360 and/or standard imperial (inches) 305, 355. The numbers indicate inches for the standard imperial scale, and centimeters for the metric scale. Tick marks indicate fractions of an inch or fractions of a centimeter, depending upon the scale.

The rulers 130, 135 may be formed using any suitable printing, engraving, molding or etching process. In an exemplary embodiment, the indicia is laser etched, such as with a $CO_2$ laser. Alternatively, an industrial inkjet printer may print the indicia on the plastic substrate.

The tile square 100 is preferably composed of transparent plastic. By way of example and not limitation, the triangular sheet and fence may be comprised of polycarbonate sheeting and bar; or polymethyl methacrylate (acrylic) sheeting and bar; or polyester terephthalate glycol modified (PETG) sheeting and bar; or clear polyvinyl chloride (PVC) sheeting and bar. The thickness of the sheet may vary from 1/16 in. to 3/4 in., with thicknesses in the range of 1/8 in. to 3/8 in. being more preferable. The fence may be about 1/5 in. to 1/2 in. in width, by 1/2 in. to 1 in. in height, and a length equal to the length of the side of the triangle to which the fence is attached.

A plurality of templates are formed in the sheet between the sides and hypotenuse. The templates include a plurality of circular holes 145, 150, 155, 160, 165, 170 for a range of pipe sizes and a series of arcs 140 defining peripheral boundaries of a closet or toilet flange. In the exemplary embodiment, the holes have diameters of about 1.15 in., 1.38 in., 4.5 in., 1.9 in., 2.38 in., and 0.84 in., respectively. These diameters equal or slightly exceed the outer diameters of Schedule 40 cpcv (chlorinated polyvinyl chloride) pipe (or pvc pipe in the case of drain pipes) having the following nominal pipe sizes: 3/4 in., 1 in., 4 in., 1 1/2 in., 2 in., and 1/2 in., respectively. More specifically, as shown in FIG. 1 and the magnified views of FIGS. 9-15, nominal pipe sizes are 3/4" cpcv 300, 1" cpcv 315, 1 1/2" cpvc 335, 2" cpcv 340, 4.25" Drain 325, and 1/2" cpvc 350, and 6.875" Toilet flange 345. Additional text along a side 110 of the tile square 100 include "Designed in the USA Patent Pending" 330 and "Get your own @ official big johnson tile square.com" 320.

Tile setters frequently use diamond hole saws to cut holes in tiles. Such saws are available in a range of sizes, from fractions of an inch to several inches in diameter. Such sizes include, but are not limited to 1 in., 1 1/4 in., 1 3/8 in., 1 1/2 in., 2 in., 2 3/8 in., 2 1/2 in., 4 1/4 in., 4 3/8 in., 4 1/2 in. and 7-inch. Such a range of sizes would accommodate every hole marked using the tool. A hole saw having a diameter at least equal to the marked hole may be used to cut the hole. A hole that is too small might not allow passage of a pipe. If a hole saw having a diameter exactly equal to the marked hole is not available, a hole saw having the next larger diameter should be used. By way of example and not limitation, a hole saw having a diameter of 4 1/2 in. may be used to cut a hole marked using template 155. If the cut hole has a slightly larger diameter than the marked hole, additional space can readily be filled with a filler, such as grout, after installation.

Figure 3:
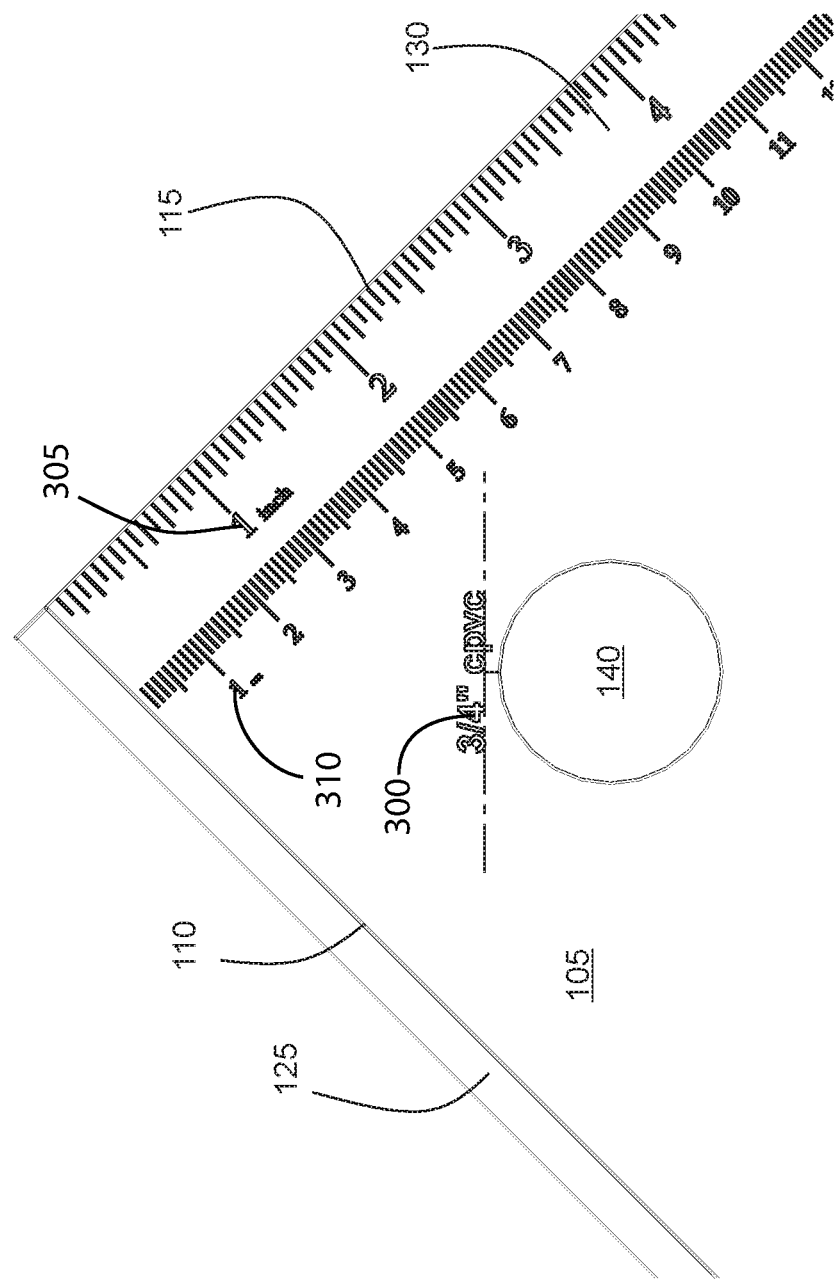
FIG. 3 is a plan view of a portion of an exemplary tile square according to principles of the invention.

With reference to FIG. 3, the hole 140 is provided for marking an opening for a 3/4 in. cpvc pipe. The hole has a diameter that is at least equal to, preferably slightly greater than, the outer diameter of a cpvc pipe. The outer diameter of a 3/4-inch cpvc pipe is about 1.05 inches. Therefore, the hole 140 has a diameter that is at least 1.05 inches, and preferably slightly greater. By way of example and not limitation, the marked hole 140 may have a diameter of 1.15 inches.

Figure 4:
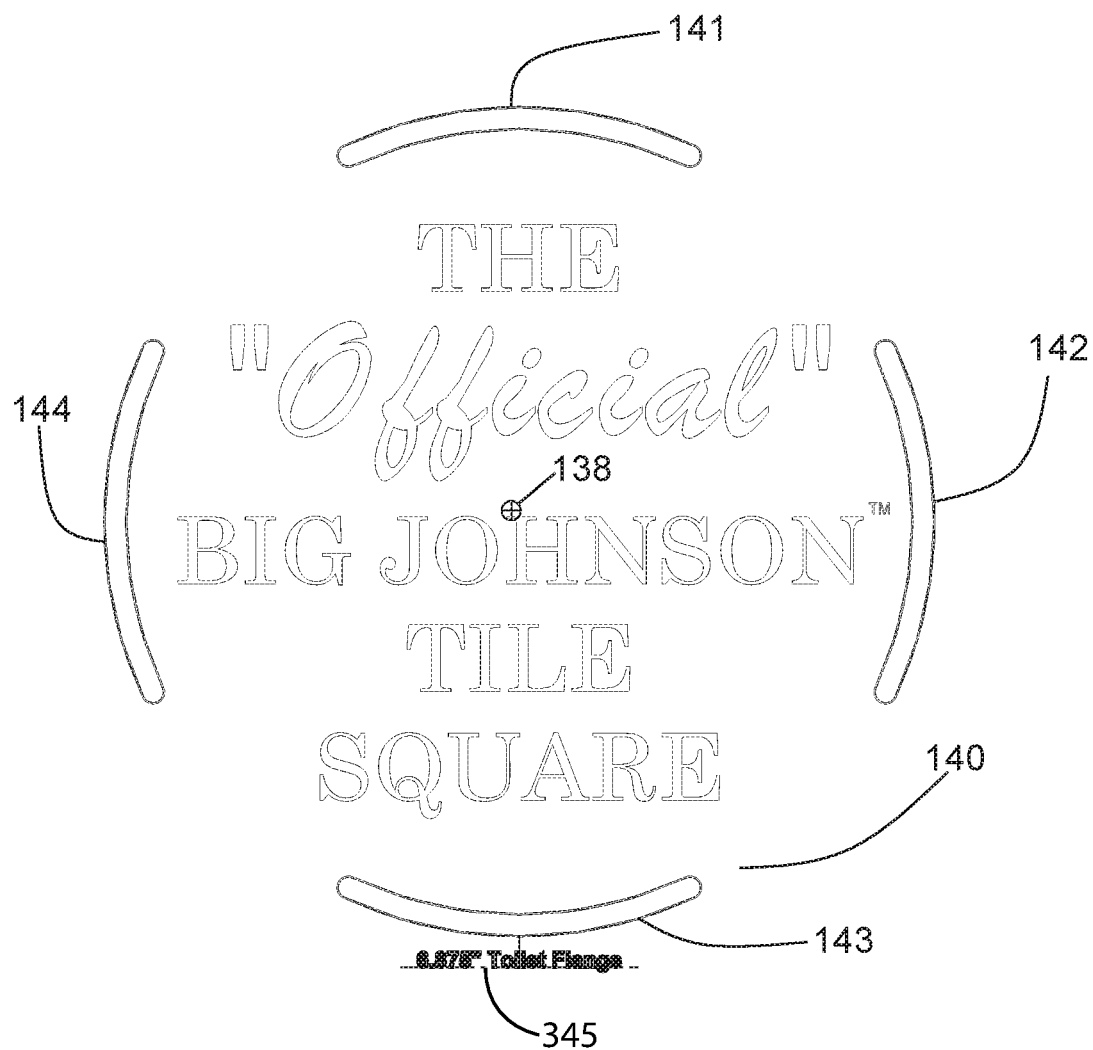
FIG. 4 is a plan view of another portion of an exemplary tile square according to principles of the invention.

With reference to FIG. 4, to maintain structural integrity of the tool and to allow a center marking on the tool, a plurality 140 of arcs 141, 142, 143, 144 are formed. Each arc has a width sufficient to receive a pen or pencil tip. A width of about 0.175 to 0.20-inch will suffice. The arcs are evenly spaced apart around a common center 138, which may be marked (e.g., printed, laser engraved or etched indicium) on the tool or may comprise a small hole through the triangular sheet 105. Each arc subtends an angle of about 60°. The diameter from one arc to the opposite arc is at least about 6.875 in.

The distance from a finished wall for a toilet flange is referred to as the "rough in." The most common rough in is 12 in., although some toilets require 14 in. and some others require only 10 in. A measurement of the distance from the finished wall to the toilet flange may be made. Then, using the tool, an erasable line may be drawn from the edge of the tile that will be immediately adjacent to the finished wall, at the toilet flange. The line may be positioned and sized to define the center of the toilet flange. Spacing from the wall for grouting may be taken into account when determining the length of the line. A perpendicular intersecting line may also be drawn. The intersection may define the center of the toilet flange. Then the center 138 of arcs 140 may be positioned over the center marked by the lines drawn on the tile. Then each arc 141, 142, 143, 144 may be drawn on the tile.

Figure 5:
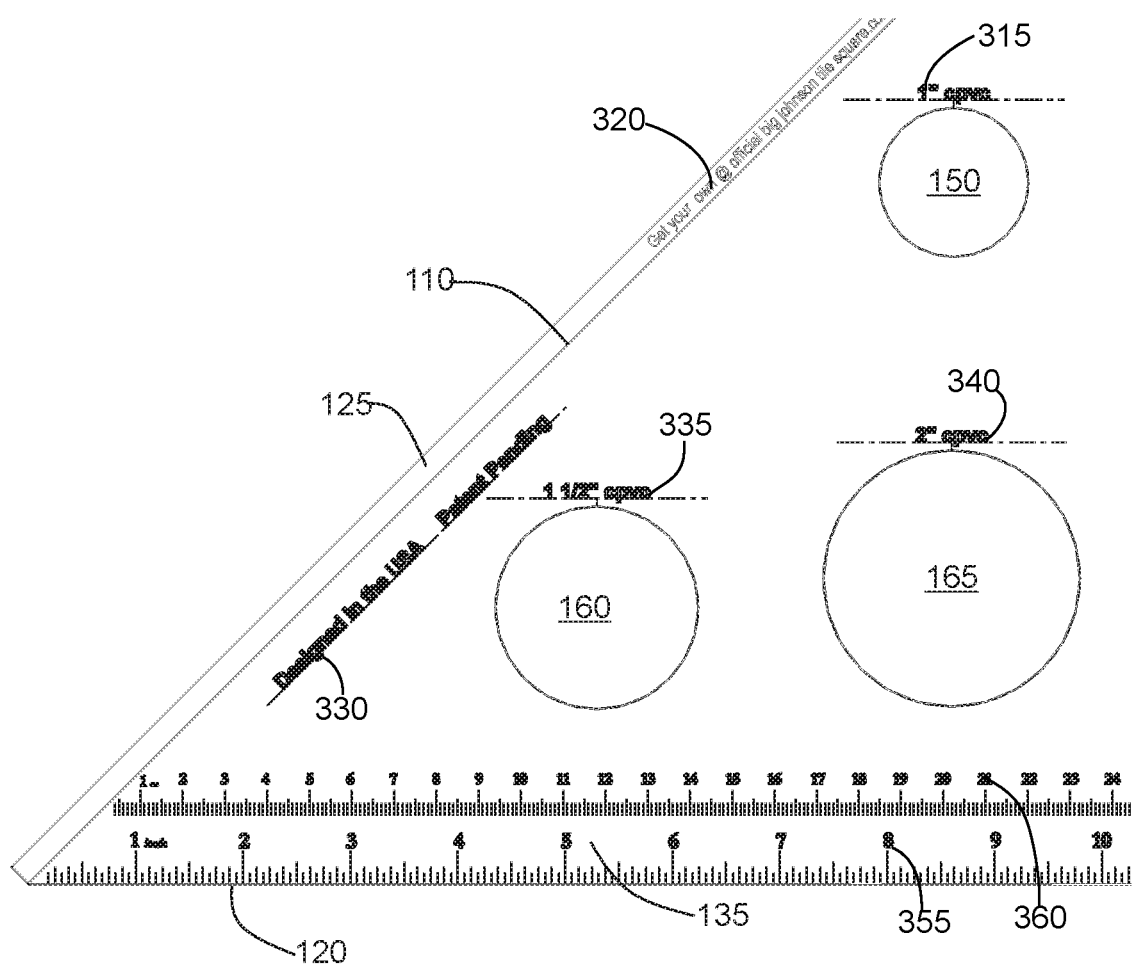
FIG. 5 is a plan view of another portion of an exemplary tile square according to principles of the invention.

With reference to FIG. 5, the hole 150 is provided for marking an opening for a 1 in. cpvc pipe. The hole has a diameter that is at least equal to, preferably slightly greater than, the outer diameter of a cpvc pipe. The outer diameter of a 1 in. cpvc pipe is about 1.315 in. Therefore, the hole 150 has a diameter that is at least 1.315 in., and preferably slightly greater. By way of example and not limitation, the marked hole 140 may have a diameter of about 1.38 in.

The hole 160 is provided for marking an opening for a 1½ in. cpvc pipe. The hole has a diameter that is at least equal to, preferably slightly greater than, the outer diameter of a cpvc pipe. The outer diameter of a 1½ in. cpvc pipe is about 1.9 in. Therefore, the hole 160 has a diameter that is at least 1.315 in., and preferably slightly greater. By way of example and not limitation, the marked hole 160 may have a diameter of at least about 1.9 in.

The hole 165 is provided for marking an opening for a 2 in. cpvc pipe. The hole has a diameter that is at least equal to, preferably slightly greater than, the outer diameter of a cpvc pipe. The outer diameter of a 2 in. cpvc pipe is about 2.375 in. Therefore, the hole 160 has a diameter that is at least 2.375 in., and preferably slightly greater. By way of example and not limitation, the marked hole 165 may have a diameter of at least about 2.38 in.

Figure 6:
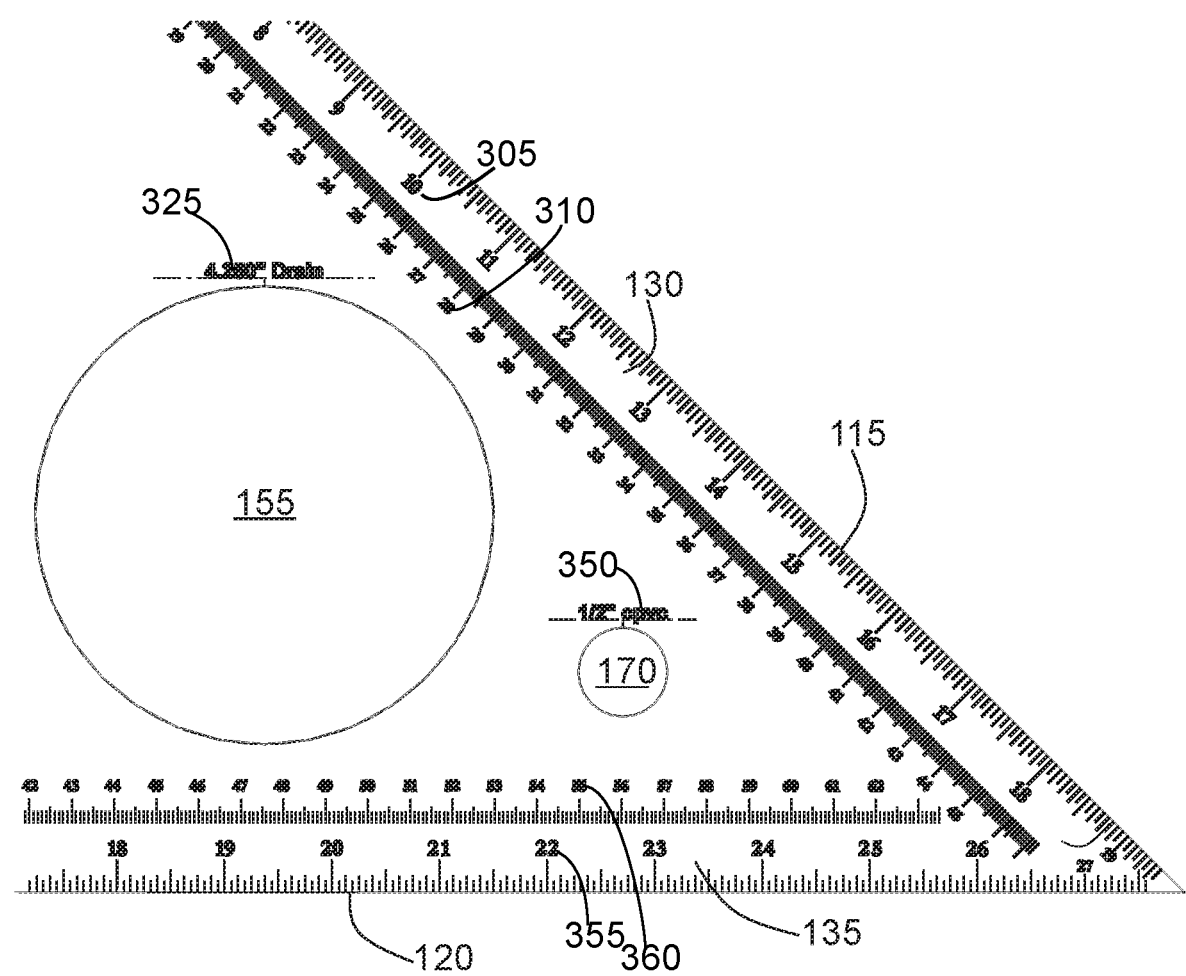
FIG. 6 is a plan view of another portion of an exemplary tile square according to principles of the invention.

With reference to FIG. 6, the hole 155 is provided for marking an opening for a drain pipe, typically a 4 in. pvc pipe. The hole has a diameter that is at least equal to, preferably slightly greater than, the outer diameter of a pvc pipe. The outer diameter of a 4 in. pvc pipe is about 4.5 in. Therefore, the hole 155 has a diameter that is at least 4.5 in., and preferably slightly greater. By way of example and not limitation, the marked hole 155 may have a diameter of at least about 4.5 in.

The hole 170 is provided for marking an opening for a ½ in. cpvc pipe. The hole has a diameter that is at least equal to, preferably slightly greater than, the outer diameter of a cpvc pipe. The outer diameter of a ½ in. cpvc pipe is about 0.84 in. Therefore, the hole 170 has a diameter that is at least 0.84 in., and preferably slightly greater. By way of example and not limitation, the marked hole 170 may have a diameter of at least about 0.84 in.

Figure 7:
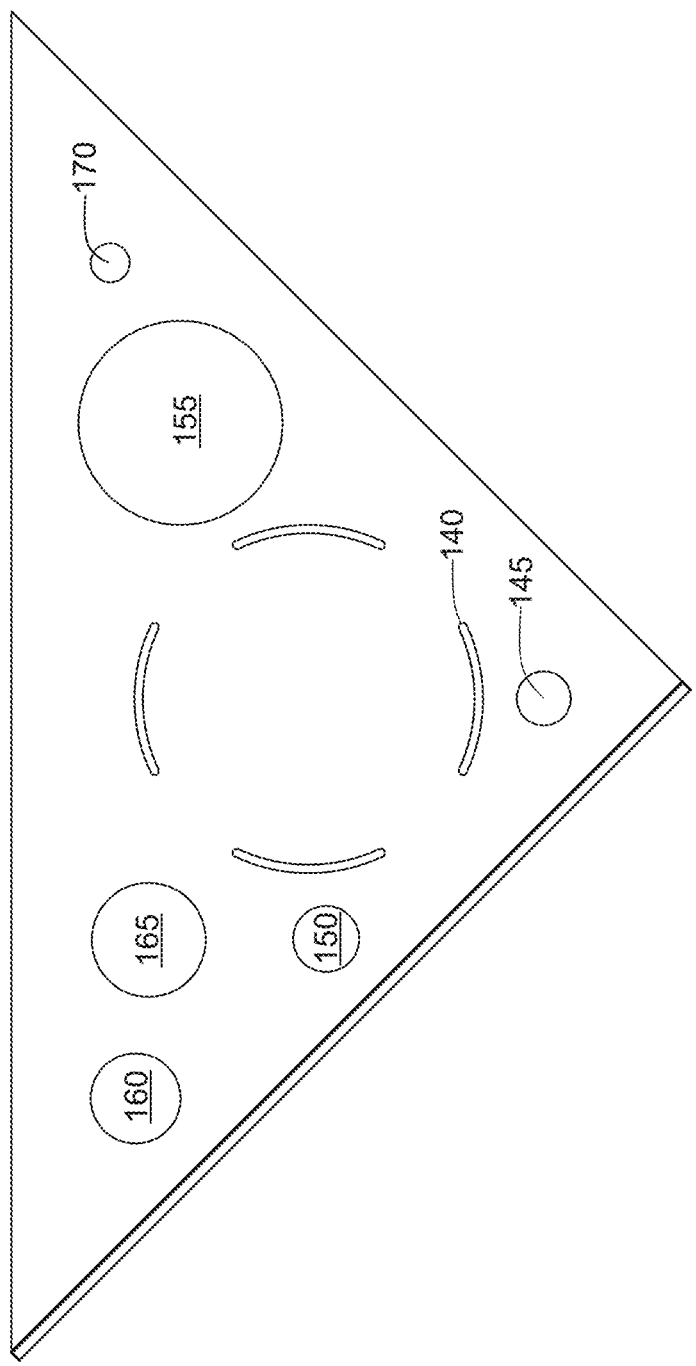
FIG. 7 is a bottom view of another portion of an exemplary tile square according to principles of the invention.

FIG. 7 is a bottom view of the exemplary tile square according to principles of the invention. Arcs 140 and template holes 145, 150, 155, 160, 165 and 170 are shown. While as shown, the bottom side omits indicia, in another embodiment indicia may be provided on the bottom side.

Figure 8:
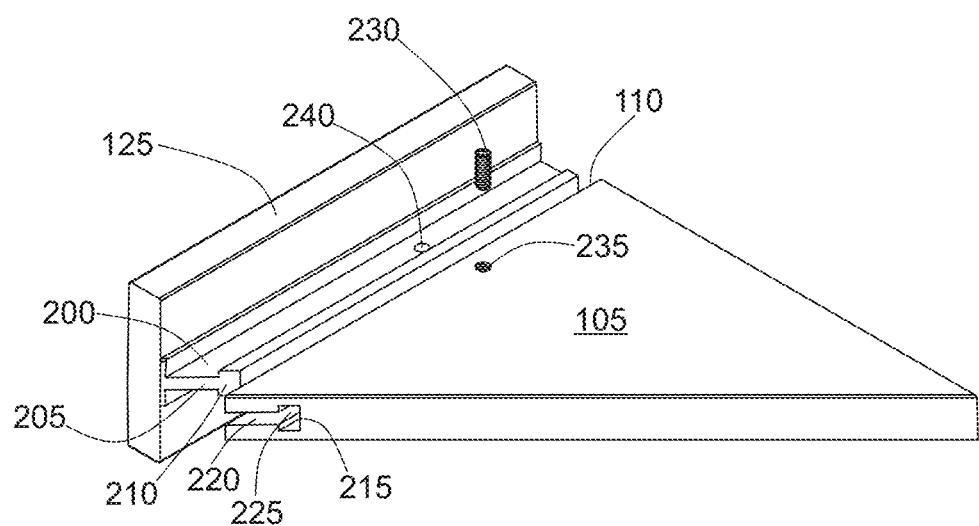
FIG. 8 is a perspective view of a portion of an exemplary removable fence for a tile square according to principles of the invention.
Figure 9:
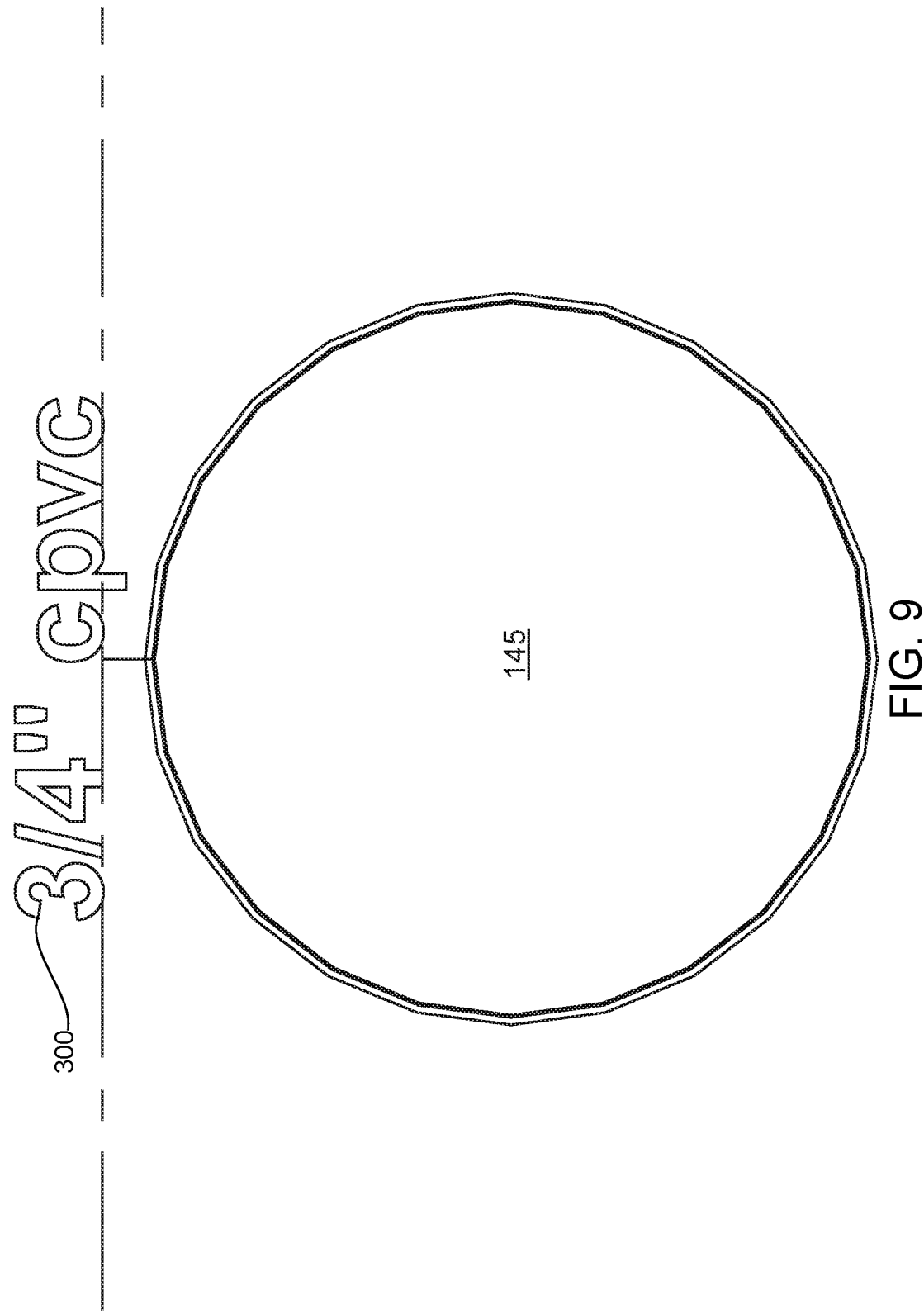
FIG. 9 is a magnified view of a hole and corresponding text of an exemplary tile square according to principles of the invention.
Figure 10:
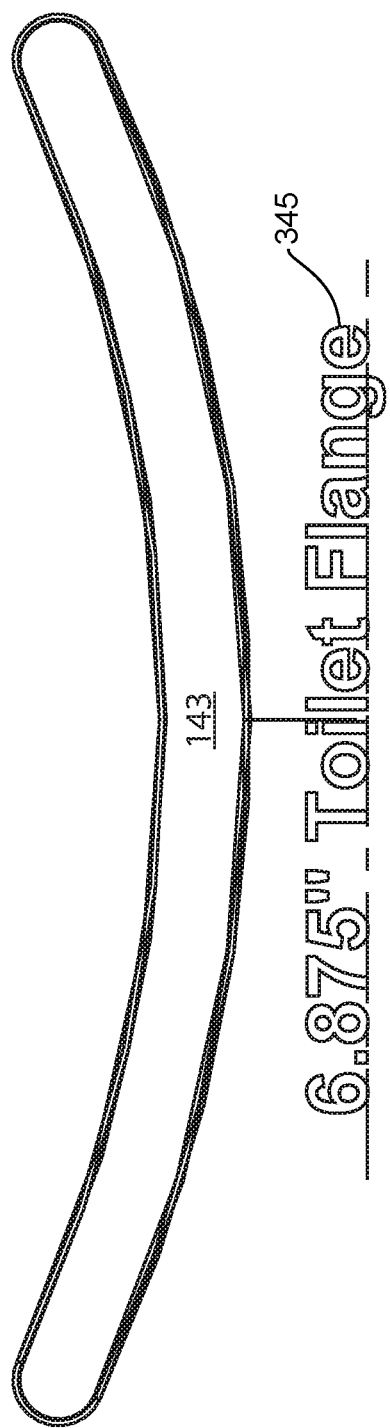
FIG. 10 is a magnified view of an arc and corresponding text of an exemplary tile square according to principles of the invention.
Figure 11:
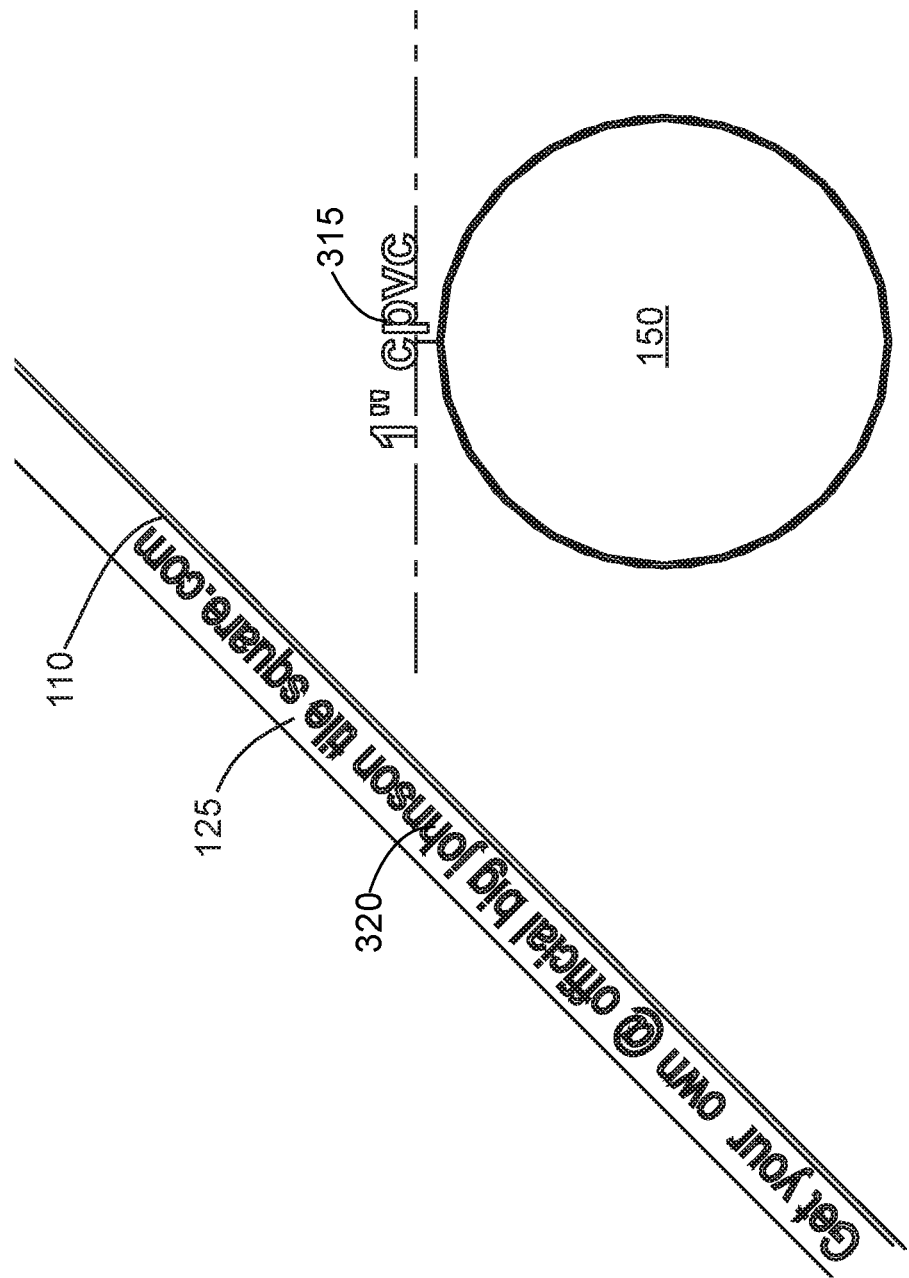
FIG. 11 is a magnified view of a hole, corresponding text and a portion of a side of an exemplary tile square according to principles of the invention.
Figure 12:
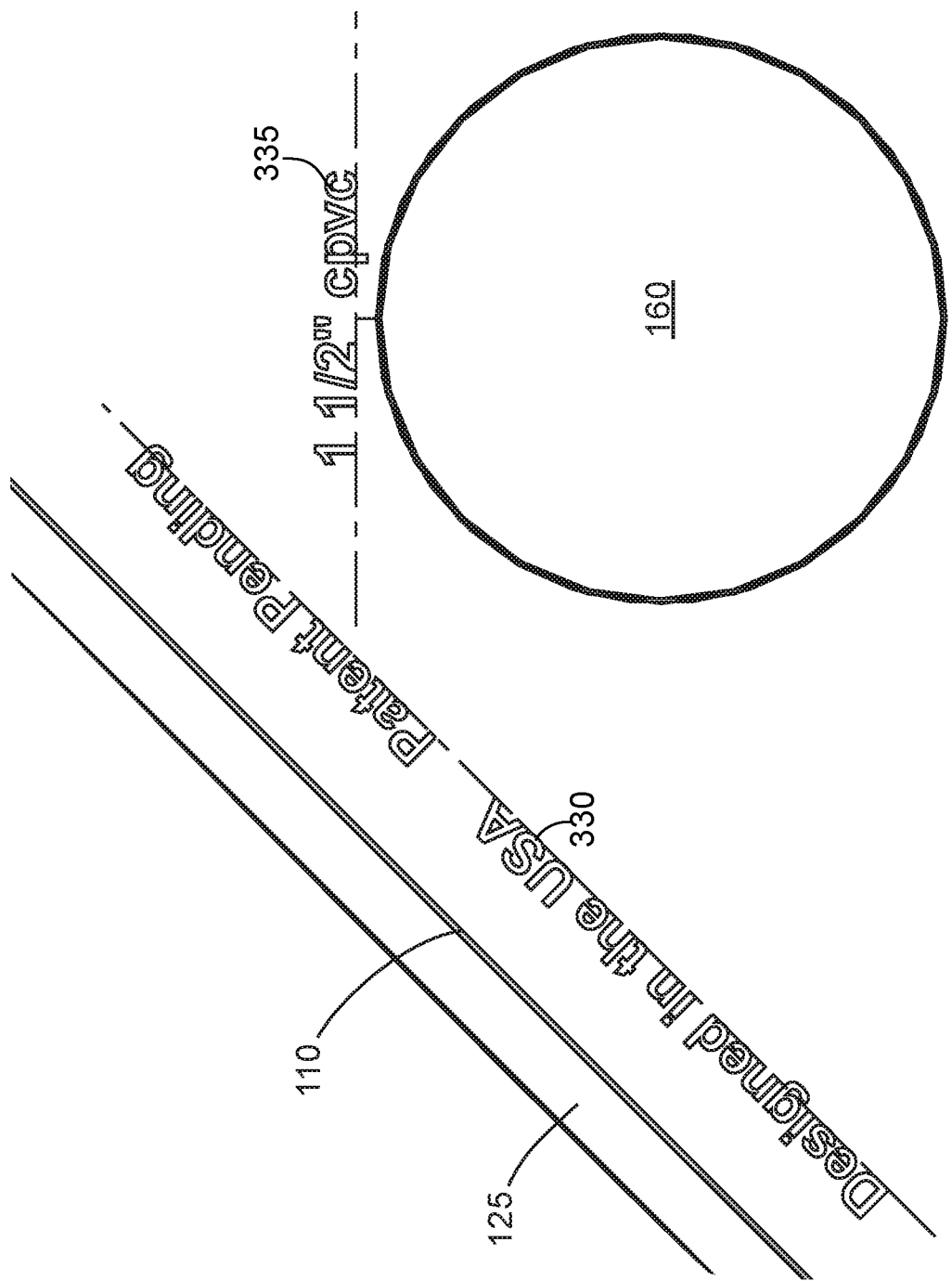
FIG. 12 is a magnified view of a hole, corresponding text and a portion of a side of an exemplary tile square according to principles of the invention.
Figure 13:
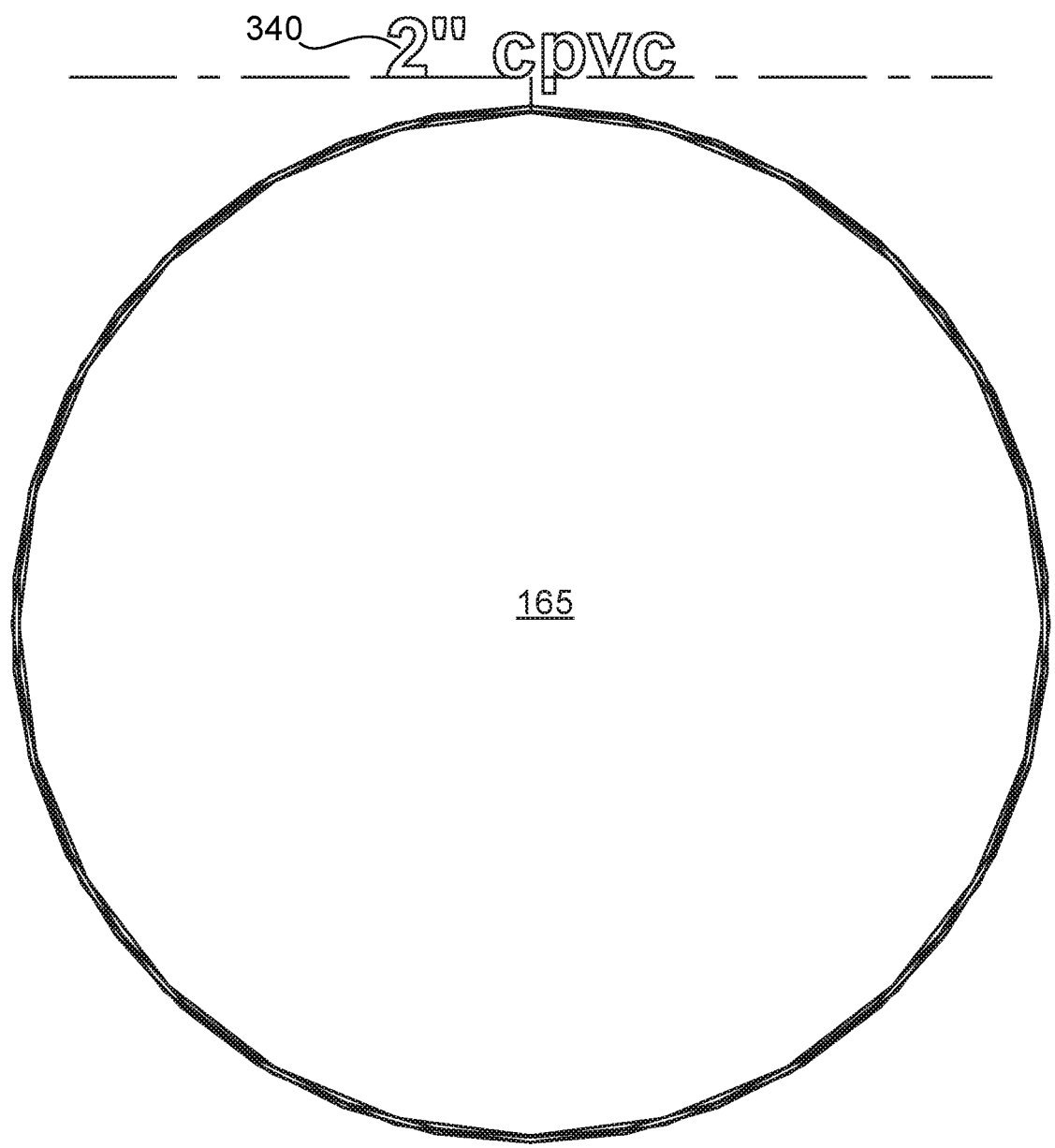
FIG. 13 is a magnified view of a hole and corresponding text of an exemplary tile square according to principles of the invention.
Figure 14:
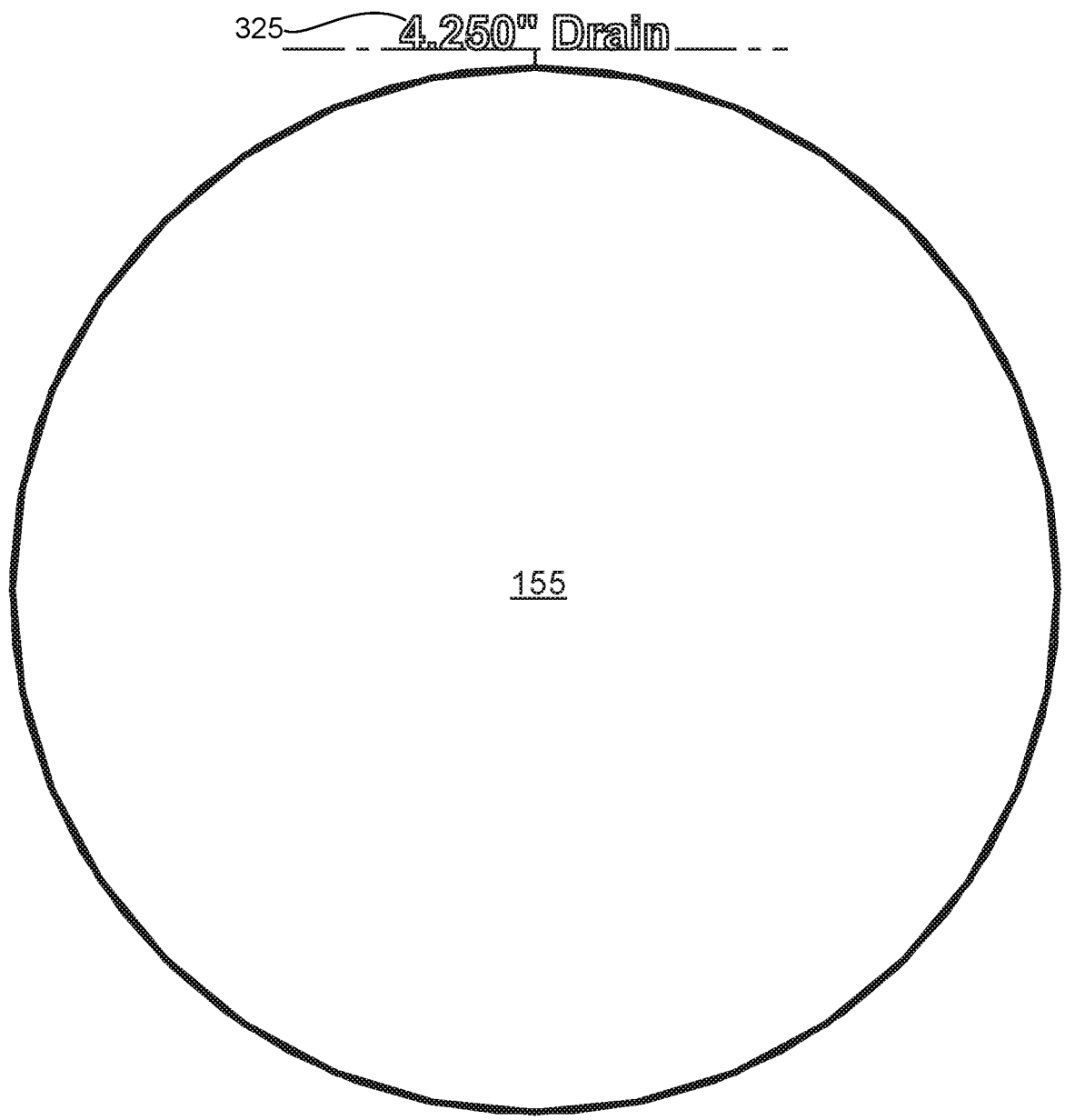
FIG. 14 is a magnified view of a hole and corresponding text of an exemplary tile square according to principles of the invention.
Figure 15:
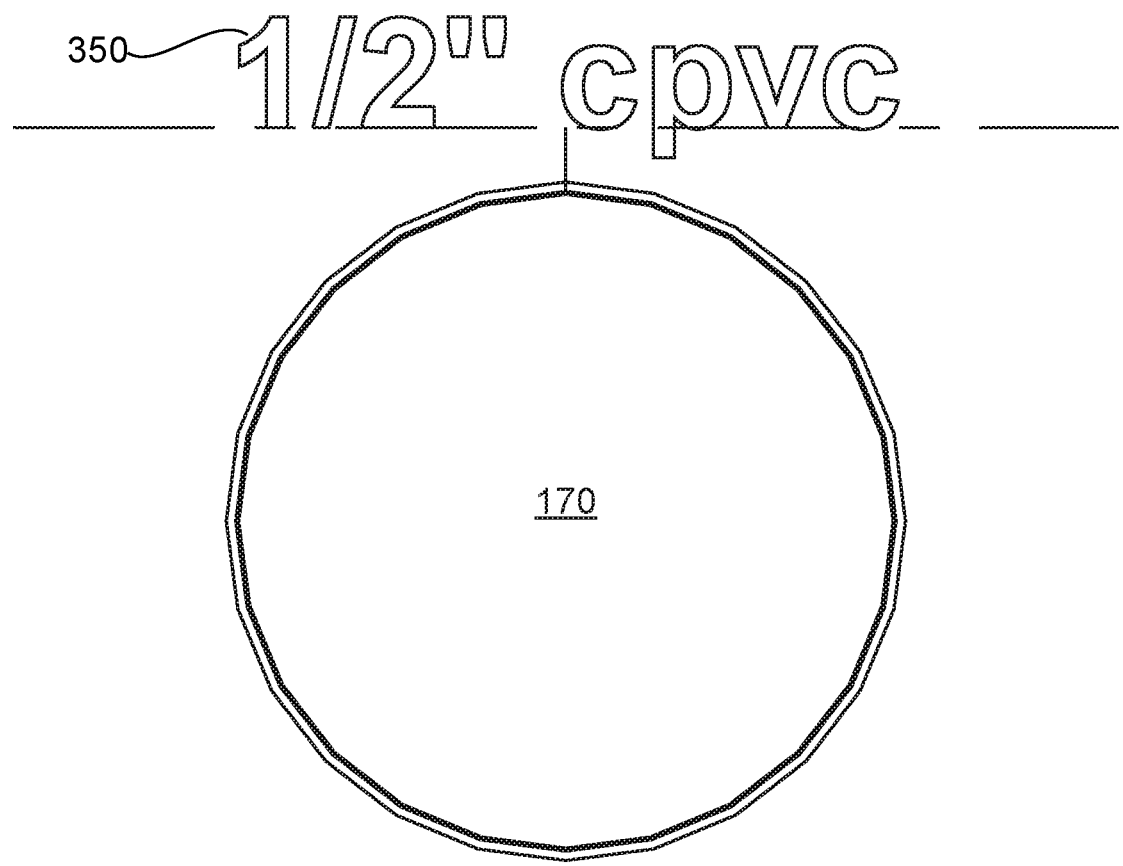
FIG. 15 is a magnified view of a hole and corresponding text of an exemplary tile square according to principles of the invention.
Figure 16:
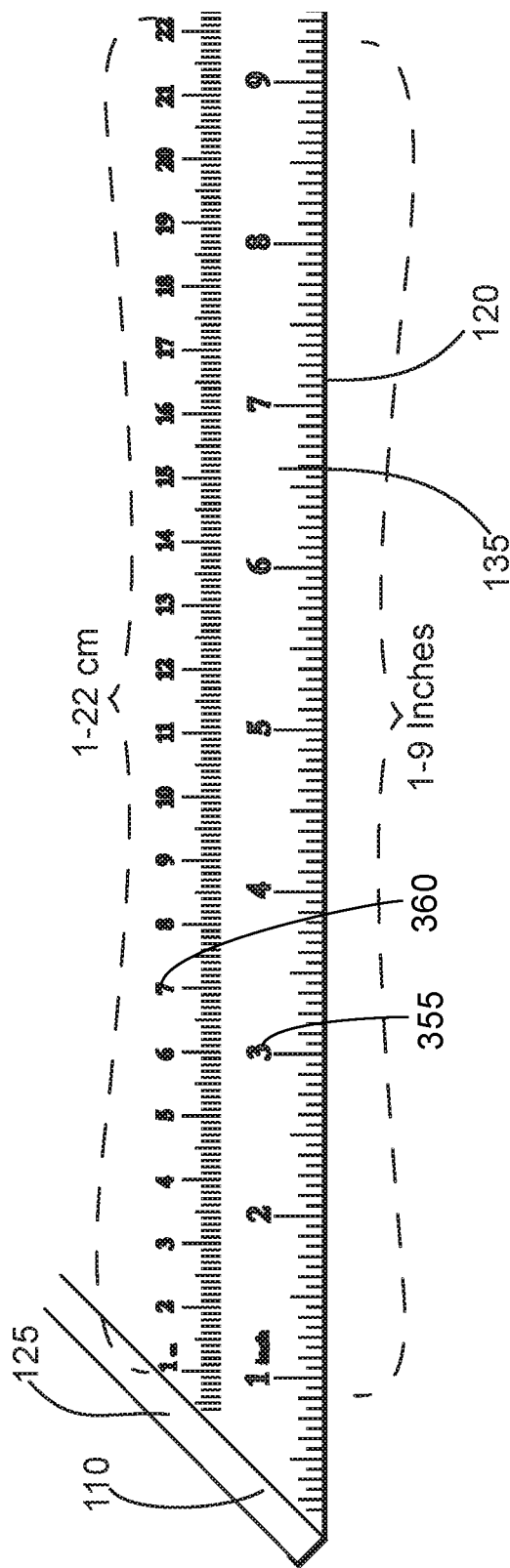
FIG. 16 is a magnified view of a portion of a ruler along the hypotenuse of an exemplary tile square according to principles of the invention.
Figure 17:
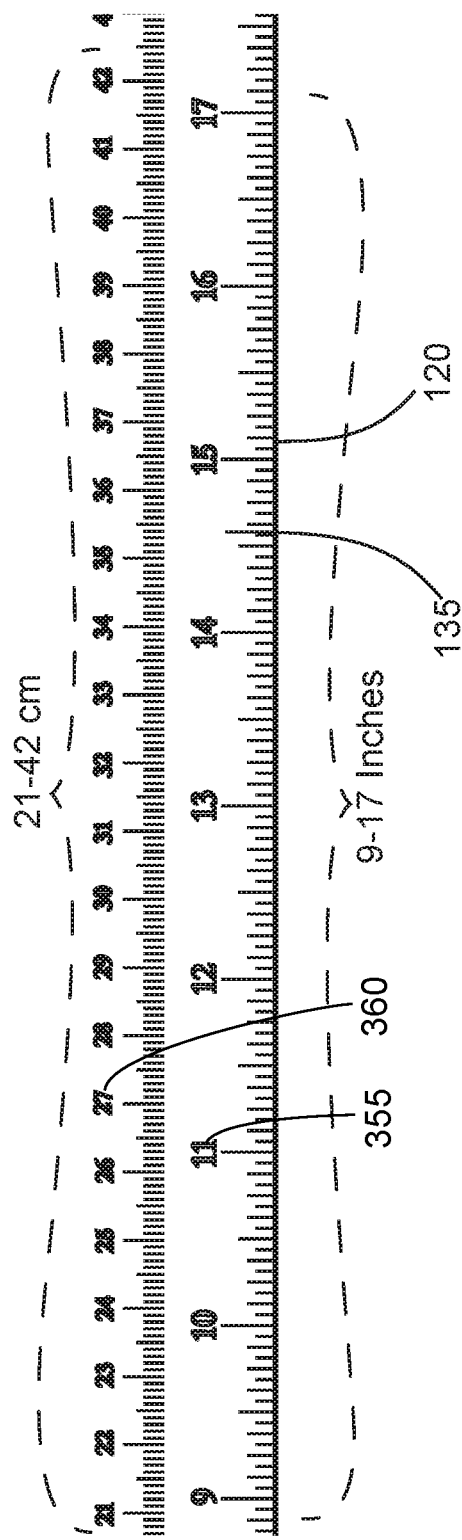
FIG. 17 is a magnified view of a portion of a ruler along the hypotenuse of an exemplary tile square according to principles of the invention.
Figure 18:
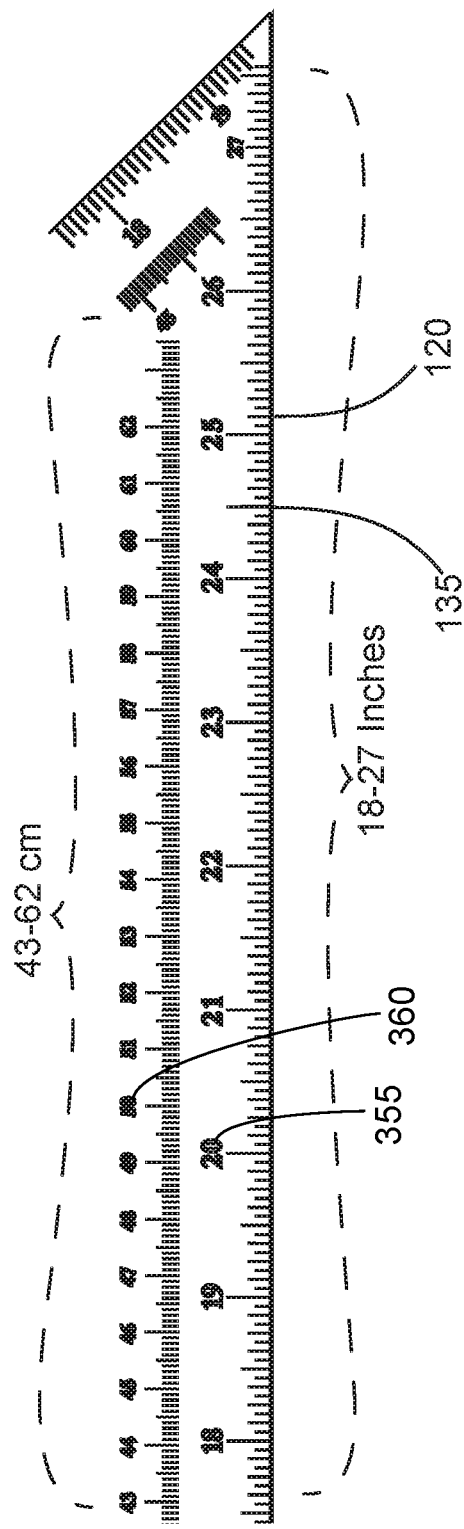
FIG. 18 is a magnified view of a portion of a ruler along the hypotenuse of an exemplary tile square according to principles of the invention.
Figure 19:
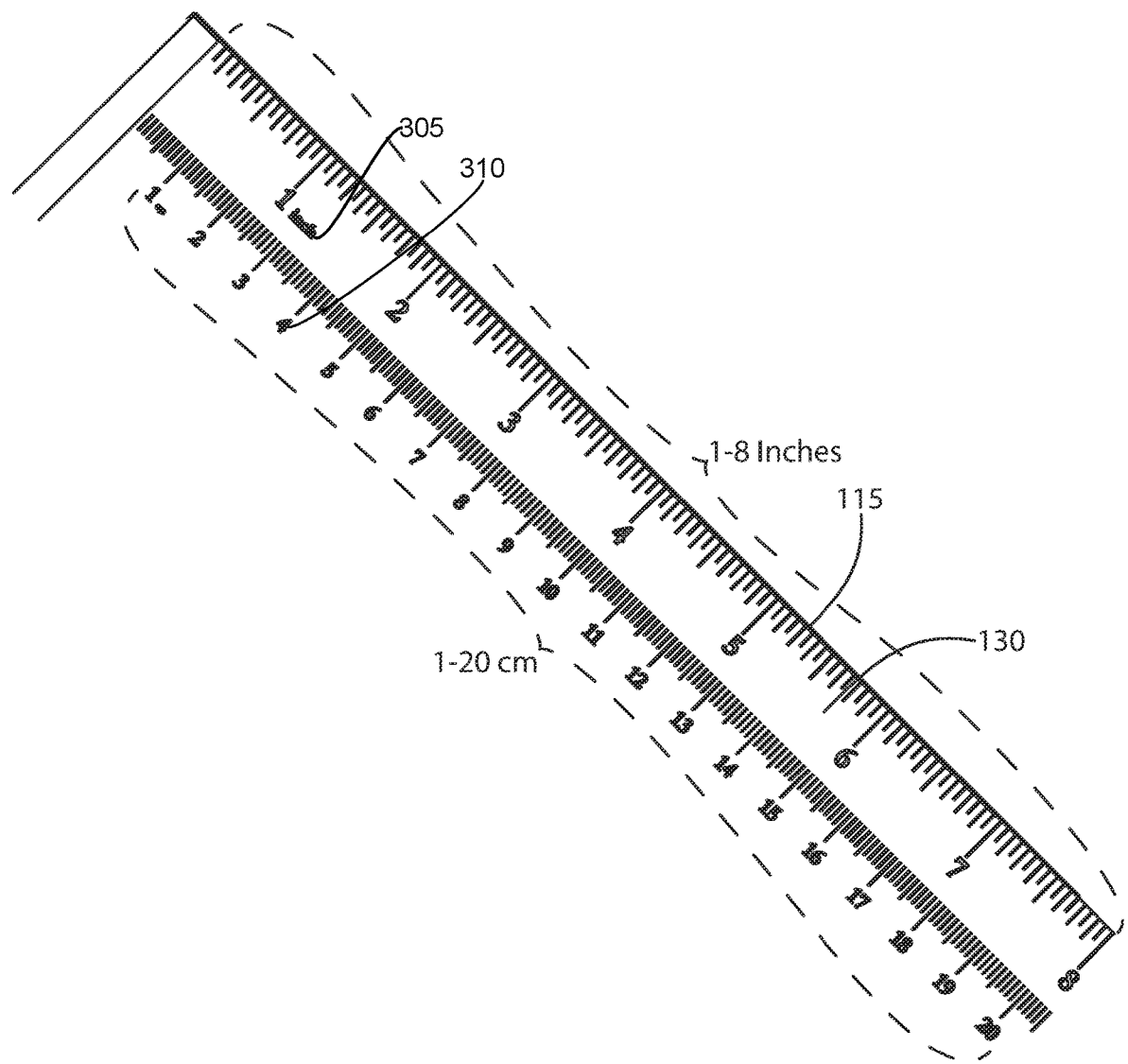
FIG. 19 is a magnified view of a portion of a ruler along a side of an exemplary tile tile square according to principles of the invention.
Figure 20:
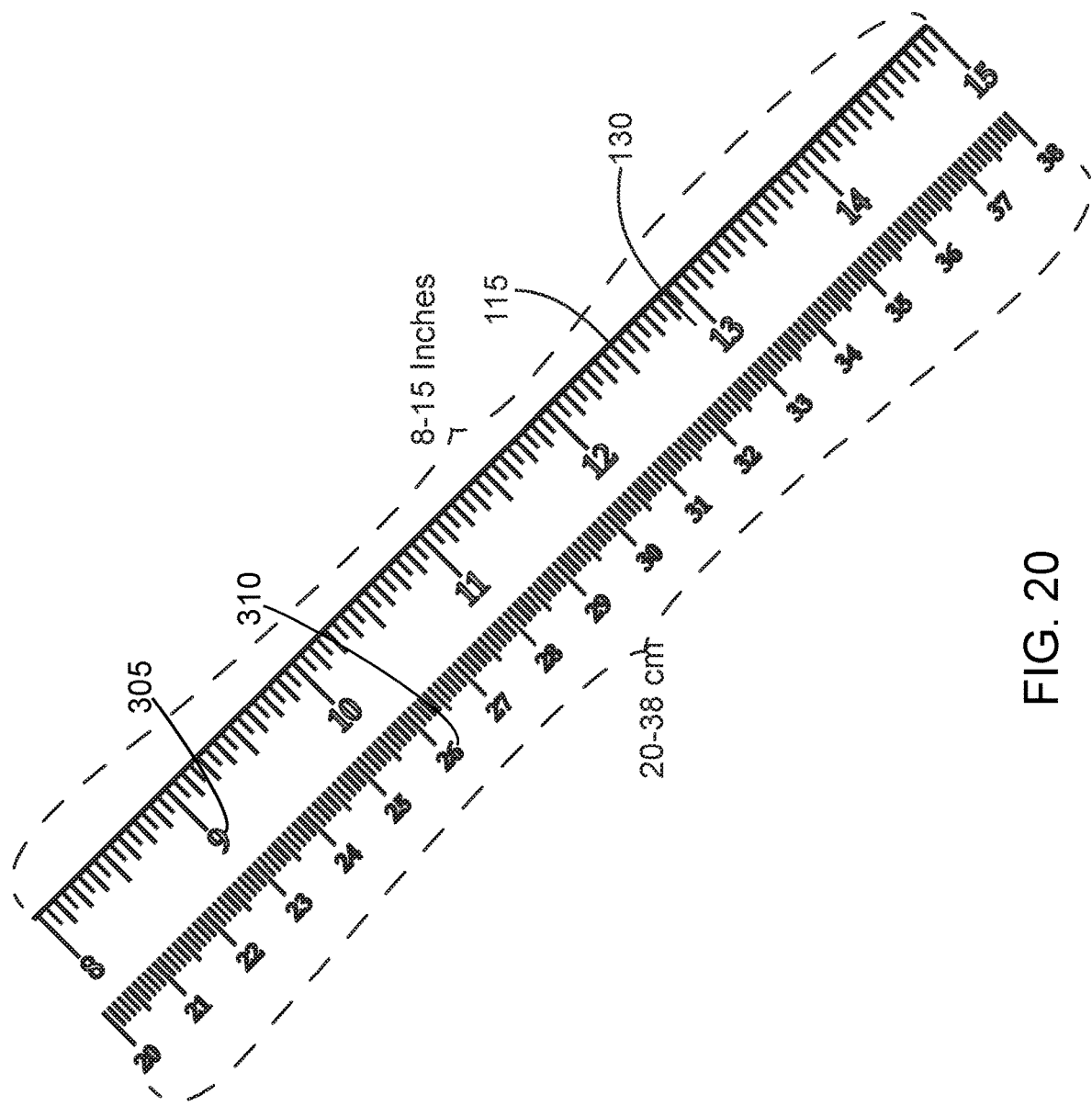
FIG. 20 is a magnified view of a portion of a ruler along a side of an exemplary tile square according to principles of the invention.
Figure 21:
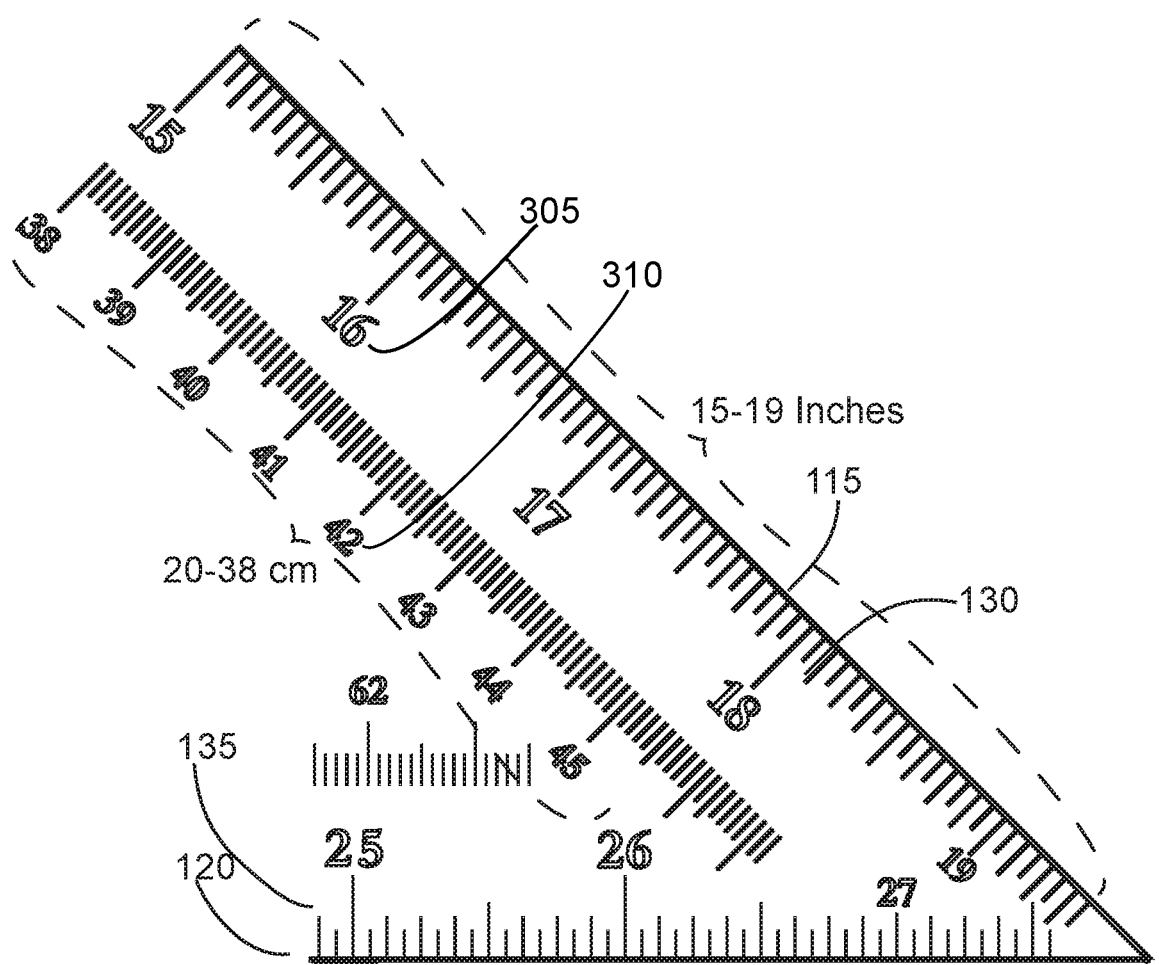
FIG. 21 is a magnified view of a portion of a ruler along a side of an exemplary tile square according to principles of the invention.

FIG. 8 provides a perspective view of a portion of an exemplary removable fence for a tile square according to principles of the invention. A removable fence is optional. In one embodiment, the fence 125 may be detachable from the triangular sheet 105 by sliding motion. A keyway 215 may be formed in the mating edge of the triangular sheet 105. The keyway 215 is shaped and sized to slidingly receive a mating key 200. The mating key 200 protrudes from a mating side of the fence 125. The mating key 200 extends outwardly orthogonally from about the midline of the fence 125. The key 200 slides into the keyway 215. In the exemplary embodiment, the key has a T-shaped cross section comprising a first panel 205 extending orthogonally from the side of the fence 125 and a second panel 210 at the opposite end. The second panel 210 is orthogonal to the first panel 205. Likewise, the keyway 215 has a first channel 220 configured to receive the first panel 205, and a second channel 225 configured to receive the second panel 210. The channels are sized to provide a snug fit, yet allow sliding installation and removal of the fence. This embodiment of the invention is not limited to a joint featuring a T-shaped key and mating keyway. Rather, other joints, including tongue-and-groove and dovetail joints, may be used without departing from the scope of the invention. Additionally, releasable snap-fit couplings may be used in lieu of a sliding keyway joint, without departing from the scope of the invention. Furthermore, the female slot of a joint may be formed in the fence, while the mating edge of the triangular sheet 105 may be shaped to be slidingly received in the slot.

Optionally, to resist unintended movement or dislodging of the fence, one or more set screws 230 may thread through a threaded hole 235 in the triangular sheet until the tip of each set screw sits flush in a recess 240 or hole in the key 200. The set screw thus resists sliding motion of the fence 125 relative to the sheet 105.

The invention is not limited to any particular composition or sizes of pipes. The holes may be sized to accommodate plumbing pipes having diameters different than those discussed above in connection with the exemplary embodiment.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A tile marking tool comprising:
a sheet, the sheet having a right isosceles plan shape, including three sides, one of the three sides being a hypotenuse, and the other two of the three sides being about equal length, the equal length being at least 18 inches;
a plurality of holes in the sheet, each hole of the plurality of holes having a circular shape and a diameter, the diameter of each hole being about equal to one of a plurality of pipe outer diameters, and the diameter of each hole of the plurality of holes being different from the diameter of each other hole of the plurality of holes;
a fence attached to one of the two sides of about equal length; and
a plurality of apertures in the sheet, each aperture of the plurality of apertures being arc-shaped, and the plurality of apertures having a common center and defining portions of a perimeter of a circle having a diameter about equal to the outer diameter of a toilet flange.

2. A tile marking tool according to claim 1, the sheet being a transparent plastic sheet.

3. A tile marking tool according to claim 1, the plurality of pipe outer diameters being outer diameters of plumbing pipes.

4. A tile marking tool according to claim 3, further comprising an indicium marking the common center of the plurality of apertures.

5. A tile marking tool according to claim 3, further comprising a center hole marking the common center of the plurality of apertures.

6. A tile marking tool according to claim 3, the plurality of apertures including 4 apertures.

7. A tile marking tool according to claim 3, the plurality of apertures being evenly spaced.

8. A tile marking tool according to claim 3, each aperture of the plurality of apertures subtending an angle of about 60°.

9. A tile marking tool according to claim 1, the fence comprising a bar coterminous in length with the side to which the fence is attached.

10. A tile marking tool according to claim 1, the fence being permanently attached to the side to which the fence is attached.

11. A tile marking tool according to claim 1, the fence being releasably attached to the side to which the fence is attached.

12. A tile marking tool according to claim 11, a sliding joint releasably connecting the fence to the side to which the fence is attached.

13. A tile marking tool according to claim 1, further comprising ruler indicia along the side opposite the side to which the fence is attached.

14. A tile marking tool according to claim 13, the ruler indicia comprising tick marks and numbers indicating lengths designated by some of the tick marks, the tick marks being parallel spaced apart lines.

15. A tile marking tool according to claim 13, the ruler indicia being laser engravings.

16. A tile marking tool according to claim 1 the equal length being at least 19 inches.

17. A tile marking tool according to claim 1,
the equal length being at least 19 inches; and
the sheet being a transparent plastic sheet; and
the fence comprising a bar coterminous in length with the side to which the fence is attached;
the tile marking tool further comprising four apertures in the sheet, each aperture being arc-shaped, and the four apertures being evenly spaced, having a common center, and defining portions of a perimeter of a circle having a diameter about equal to the outer diameter of a toilet flange, and each aperture of the four apertures subtending an angle of about 60°.

18. A tile marking tool according to claim 17, the fence being permanently attached to the side to which the fence is attached.

19. A tile marking tool according to claim 17, the fence being releasably attached to the side to which the fence is attached.

20. A tile marking tool according to claim 17, further comprising ruler indicia along the side opposite the side to which the fence is attached, the ruler indicia comprising tick marks and numbers indicating lengths designated by some of the tick marks, the tick marks being parallel spaced apart lines, the ruler indicia being laser engravings.

* * * * *